(No Model.) 2 Sheets—Sheet 1.

J. S. ROBBINS.
FEEDING DEVICE FOR POTATO PLANTERS.

No. 540,458. Patented June 4, 1895.

Witnesses:
R. Schleicher
F. Benner

Inventor:
Josiah S. Robbins
by his Attorneys
Howson & Howson (No Model.) 2 Sheets—Sheet 2.

J. S. ROBBINS.
FEEDING DEVICE FOR POTATO PLANTERS.

No. 540,458. Patented June 4, 1895.

Witnesses:
R. Schleicher
F. Benner

Inventor:
Josiah S. Robbins
by his Attorneys
Howson & Howson

UNITED STATES PATENT OFFICE.

JOSIAH S. ROBBINS, OF ALLENTOWN, NEW JERSEY.

FEEDING DEVICE FOR POTATO-PLANTERS.

SPECIFICATION forming part of Letters Patent No. 540,458, dated June 4, 1895.

Application filed September 8, 1894. Serial No. 522,470. (No model.)

*To all whom it may concern:*

Be it known that I, JOSIAH S. ROBBINS, a citizen of the United States, residing at Allentown, Monmouth county, New Jersey, have invented certain Improvements in Feeding Devices for Potato-Planters, of which the following is a specification.

The object of my invention is to so construct a potato planting machine as to insure the accurate dropping of the "seed" in the furrow, an object which I attain in the manner hereinafter set forth, reference being had to the accompanying drawings, in which—

Figures 1, 3:
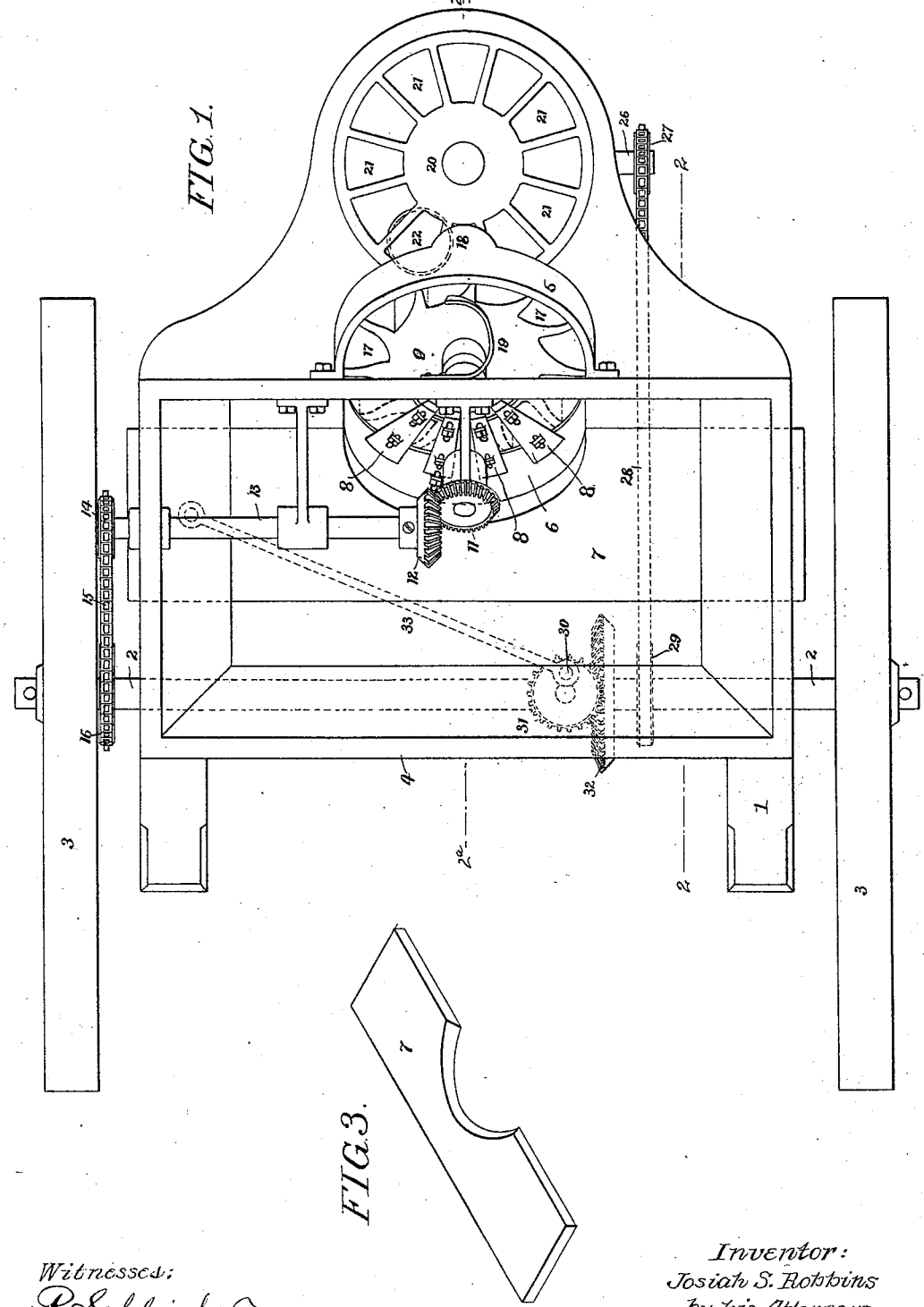
Figure 2:
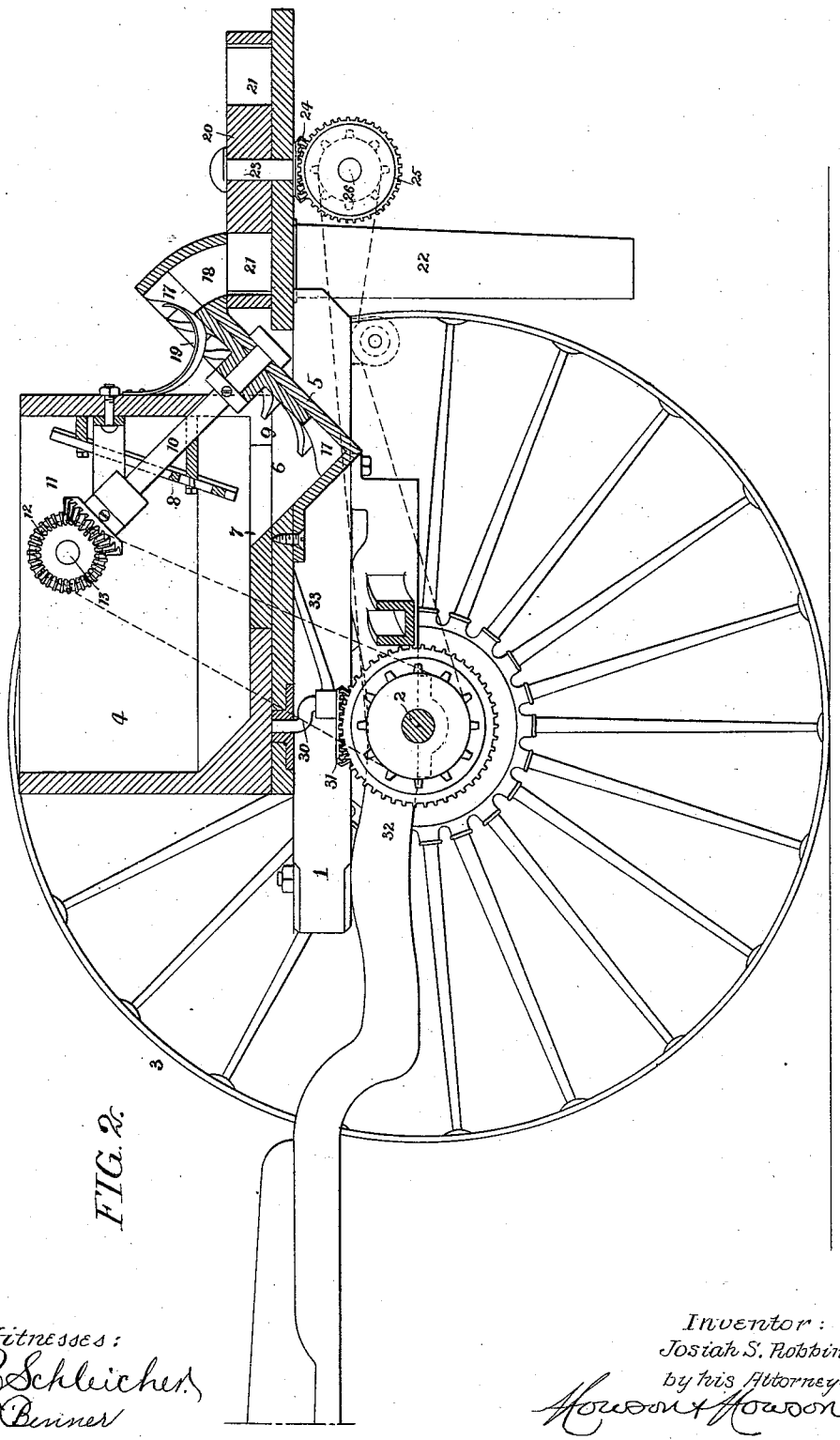

Figure 1 is a plan or top view of sufficient of a potato-planting machine to illustrate my invention. Fig. 2 is a longitudinal sectional view of the same, partly on the line 2 2 and partly on the line 2ª 2ª, Fig. 1; and Fig. 3 is a detached perspective view of part of the machine.

The cut pieces of potato constituting the "seed" used in a potato planting machine are, owing to wide differences in size and shape of the different pieces, very difficult to accurately distribute by an automatic feeder, and in a machine heretofore patented by me I have adopted, instead of an automatic seed selecting and discharging device, a manually fed wheel or disk having a series of pockets which are caused to move successively over the top of a spout or conductor leading to the furrow, the attendant depositing the seed in the pockets of the feed wheel which is so located as to be readily accessible to said attendant. Accuracy and speed in planting with such machines are dependent upon the skill and quickness of the attendant, and while good results, both as to speed and accuracy, as compared with automatic machines, have, in practice, been attained by such manually fed machines, greater speed in operation, together with the same or greater accuracy of feed are desirable, and my present invention has been devised for the attainment of this result.

The invention consists mainly of the combination of an automatic feeder adapted to receive the seed, and successively deliver the same, with a pocketed feeder receiving the seed from said automatic feeding device, but accessible to the attendant so that any defects in the operation of the automatic feeder can be corrected by the manual feeding of seed into such of the pockets of the exposed feeding device as may not have received seed from said automatic feeder.

In the accompanying drawings, 1 represents part of the rear framework of the planter, mounted upon an axle, 2, which has the usual traction wheels 3 serving to support the machine and also to drive the operating parts of the feeding mechanism.

Mounted upon the frame 1 is a hopper 4 and at the lower rear corner of the same, is an inclined feed plate 5, forming, beneath the hopper, a seed box 6, into which the seed are fed from the hopper after passing over the beveled edges of a laterally reciprocating agitator plate 7, and beneath the lower ends of a series of guard fingers 8, suitably supported upon studs at the front of a hopper and slotted for the reception of their retaining screws so that they can be adjusted vertically in order to bring their lower ends nearer to or farther from the beveled edges of the agitator plate 7 and thus prevent the choking of the seed box 6 by too rapid a flow of seed into the same.

Rotating on the inclined feed plate 5 is a pocketed feed wheel 9 carried by a rearwardly inclined shaft 10 which is mounted in suitable bearings on the hopper and has a bevel wheel 11 meshing with a like wheel 12 on a transverse shaft 13 which has at the outer end a sprocket wheel 14 receiving the belt 15 from a sprocket wheel 16 on the rotating shaft or axle of the machine, so that, as the machine is drawn forward, the feed wheel 9 will be rotated and the seed, caught in the pockets 17 around the periphery of said feed wheel, will be carried up and dropped in succession into a spout 18 formed at the upper end of the feed plate 5, the discharge of the seed from the pockets into the spout being insured by the action of a spring finger 19 which enters the pockets 17 in succession as the feed wheel 9 is rotated and forcibly ejects the seed from the said pockets and into the spout 18.

Suitably mounted on the frame of the machine, in the rear of the automatic feeding device which I have just described, is a horizontal feed wheel or disk 20, which has a series of pockets 21, these pockets, as the wheel 20 is rotated, being carried in succession beneath the spout 18 and over the top of the discharge spout 22 which conducts the seed into the furrow, so that each pocket of the wheel 20, after passing from beneath the spout 18, the discharge spout being by preference located close to the spout 18, will make almost a complete circuit around the axis of the wheel, before being brought over the spout 22.

The feed wheel 20 is carried by a vertical shaft 23 which has at the lower end a bevel wheel 24 meshing with a bevel wheel 25 on a short shaft 26 which is adapted to suitable bearings on the frame of the machine, and has at its outer end a sprocket wheel 27 for the reception of a chain belt 28 driven by a sprocket wheel 29 on the axle 2.

The pockets of the primary feed wheel 9 and the secondary feed wheel 20 are so disposed and said wheels are so driven that when one of the pockets of the wheel 9 registers with the upper end of the spout 18 one of the pockets of the wheel 20 will register with the lower end of said spout and a seed will pass from the pocket of the wheel 9 through the spout and into the pocket of the wheel 20 to be carried around by the latter and discharged through the spout 22 into the furrow.

It will be observed on reference to Fig. 2 that but a small portion of the wheel 20 is covered by the feed plate 5 and spout 18, the greater portion of said feed wheel being directly in view of the attendant so that the latter can note any empty pockets issuing from beneath the spout 18 owing to defective action of the feed wheel 9 and can, before any such empty pocket reaches the discharge spout 22, place a seed in the same by hand and thus insure a uniform and accurate placing of the seeds in the furrow.

Although my machine may be run at high speed the number of empty pockets in the feed wheel 20 to be manually filled by the attendant will be so small that such duty can be readily performed without the exercise of any special degree of quickness or skill. Hence practically perfect results can be attained without requiring any greater skill than that of an ordinary farm hand for attendance upon the machine.

The agitator plate 7 has in its front edge a curved recess corresponding with the curve in the seed box 6, this curved recess having a beveled edge so as to direct seed into the seed box and the lateral reciprocation of the agitator plate is effected by means of a crank 30, on a beveled pinion 31, driven by a bevel wheel 32 on the axle, a rod 33 extending from said crank to the plate 7.

Although I prefer the use of the rotating pocketed feed wheel 9 as a means of delivering the seed in succession to the feed wheel 20 I do not desire to limit myself thereto, as various forms of automatic feeding devices may be employed within the scope of my invention.

Having thus described my invention, I claim and desire to secure by Letters Patent—

1. A potato planter having a pocketed feeding device for delivering the seed successively into the furrow, in combination with an automatic feeder adapted to deliver seed successively to said pocketed feeding device, the latter being accessible to the attendant, whereby any defect in the operation of the automatic feeder can be corrected by manual feeding, substantially as specified.

2. The combination in a potato planter, of the hopper having a pocketed lifting feed wheel, a secondary pocketed feed wheel receiving the seed from said lifting wheel and conveying it to the discharge spout, and means for driving said feed wheels, said secondary pocketed feed wheel being so mounted upon the frame of the machine as to be capable of being manually fed by the attendant at the rear of the machine substantially as specified.

3. The combination in a potato planter, of the hopper, the pocketed lifting feed wheel, the secondary pocketed wheel, a spout for conveying the seed from the lifting feed wheel to the secondary pocketed wheel, said secondary pocketed feed wheel being so mounted upon the frame of the machine as to be capable of being fed manually by the attendant at the rear of the machine and means for rotating said wheels, substantially as specified.

4. The combination of the hopper, the seed box beneath the same and the feed wheel working in the said seed box, with a laterally reciprocated agitator plate, located at the bottom of the hopper and having a recess in its front edge substantially as specified.

5. The combination of the hopper, the seed box and the feed wheel working in said seed box, with the laterally reciprocated agitator plate having in its front edge a recess with beveled edges, substantially as specified.

6. The combination of the hopper, the seed box and the feed wheel working in said seed box, with the laterally reciprocated agitator plate, located at the bottom of the hopper and having a recess in its front edge and the series of guard fingers, substantially as specified.

In testimony whereof I have signed my name to this specification in the presence of two subscribing witnesses.

JOSIAH S. ROBBINS.

Witnesses:
WM. C. SMITH,
GEO. H. VANDERBEEK.